(12) United States Patent
Richards

(10) Patent No.: US 8,730,102 B2
(45) Date of Patent: *May 20, 2014

(54) DIGITAL BEAMFORMING ANTENNA AND DATALINK ARRAY

(75) Inventor: Wayne Edward Richards, La Mesa, CA (US)

(73) Assignee: Cubic Corporation, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/473,384

(22) Filed: May 16, 2012

(65) Prior Publication Data

US 2012/0224616 A1 Sep. 6, 2012

Related U.S. Application Data

(63) Continuation of application No. 12/265,457, filed on Nov. 5, 2008, now Pat. No. 8,203,483.

(60) Provisional application No. 61/036,405, filed on Mar. 13, 2008.

(51) Int. Cl.
*H01Q 3/00* (2006.01)
*H01Q 3/26* (2006.01)
*H04B 7/06* (2006.01)

(52) U.S. Cl.
CPC .............. *H01Q 3/267* (2013.01); *H01Q 3/26* (2013.01); *H01Q 3/2605* (2013.01); *H04B 7/0617* (2013.01)
USPC .......................................... 342/368; 342/377

(58) Field of Classification Search
USPC ................................................ 342/368, 377
See application file for complete search history.

(56) References Cited

U.S. PATENT DOCUMENTS

| 3,803,613 | A  | * | 4/1974  | Wright ......................... 342/427 |
| 5,274,844 | A  | * | 12/1993 | Harrison et al. ................ 455/25 |
| 5,909,460 | A  | * | 6/1999  | Dent ............................. 375/130 |
| 6,686,879 | B2 | * | 2/2004  | Shattil .......................... 342/367 |
| 7,047,043 | B2 | * | 5/2006  | Reilly et al. .................. 455/561 |
| 2002/0034191 | A1 | * | 3/2002  | Shattil .......................... 370/464 |
| 2004/0014429 | A1 | * | 1/2004  | Guo .............................. 455/73 |

OTHER PUBLICATIONS

Wikipedia article, "Field-programmable gate array", Mar. 12, 2008 version.*

* cited by examiner

*Primary Examiner* — Frank J McGue
(74) *Attorney, Agent, or Firm* — Kilpatrick Townsend & Stockton LLP

(57) ABSTRACT

A method and system for beamforming a multi-element array using time delays is provided. The array includes transmit array elements and receive array elements. Each of the array elements includes a processor. Modulation and demodulation functions are performed at the processors of each array element. The modulation and demodulation functions utilize receive time offsets and phase shifts, and transmit time offsets and phase shifts, respectively. The receive time offsets and phase shifts, and the transmit time offsets and phase shifts are determined by a central processing unit in order to beam form received signals and transmitted signals, respectively. The array elements are arranged in a daisy chain fashion in order to facilitate communication of control parameters, communication of bits to be transmitted and distributed combining of demodulated baseband samples from one array element to another and communicating the combined samples to the central processing unit.

28 Claims, 9 Drawing Sheets

DIGITAL BEAMFORMING ANTENNA AND DATALINK ARRAY

This application is a continuation application of U.S. patent application Ser. No. 12/265,457, filed on Nov. 5, 2008 entitled "DIGITAL BEAMFORMING ANTENNA AND DATALINK ARRAY" which is a non-provisional of U.S. Provisional Patent Application No. 61/036,405, filed Mar. 13, 2008 and entitled "DIGITAL BEAMFORMING ANTENNA/DATALINK ARRAY" which are incorporated by reference in their entirety for all purposes.

BACKGROUND

This disclosure relates in general to digital beamforming of antenna arrays, but not by way of limitation, to digital beamforming of antenna arrays utilizing distributed signal processing of time offsets amongst other things.

Antenna arrays offer a way of increasing the data rate and the signal to noise ratio of a signal. In addition, beamforming is a signal processing technique used in sensor arrays for providing directional signal transmission or reception of multiple array elements. Beamforming takes advantage of interference to change the directionality of the array. When transmitting, a beamformer controls the time, phase, and relative amplitude of the signal at each transmitter, in order to create a pattern of constructive and destructive interference. When receiving, information from different sensors is combined in such a way that the expected pattern of radiation is preferentially observed.

When a signal is coming from a direction that is not orthogonal to the plane of a planar antenna array, the signal arrives at the different array elements at different times. By adjusting the relative times that samples are taken from the received signal at the different array elements, the directionality of the receiving antennas can be electronically steered to match the direction of the incoming signal. This increases the signal to noise ratio and can enable higher data rates. Similar methods can be used to adjust the directionality of transmit signals.

Instead of adjusting the times of reception and transmission, phased arrays use waveforming techniques to adjust the relative phase offsets of the array elements during sampling of received signals or transmitting outgoing signals. The change in phase is analogous to a change in time, but only for a specific frequency. Different frequencies will vary in phase differently for a given time difference. This makes phased array techniques unsuitable for large bandwidth operations.

Regardless of which methods are used, the computational complexity of beamforming operations increases as the number of array elements in the array grows. This growth in complexity can be detrimental to characteristics of the overall system, characteristics including cost, size, weight, power consumption and heat produced by the system, for example. Often one or more of these characteristics limits the size of the antenna array systems that are practical. In addition, the scalability of systems can be difficult when a central processor performs the beamforming operations. For example, if an antenna array has 100 elements and a central processor performs the beamforming operations of all 100 elements, the central processor could require twice the computing power to support 200 elements. This linear growth of computing power of the central processor can be a major factor in limiting the scalability of antenna array systems. It is also difficult to route the signals from a large number of elements to a central processor.

SUMMARY

In one embodiment, an electronically steerable array transceiver for wireless communication is disclosed. The electronically steerable array transceiver has a body configured for mounting. Affixed to the body are a plurality of active array elements that each: receive a wireless signal, perform digital signal processing, and produce a digital result indicative of the wireless signal such that the plurality of active array elements produce a plurality of digital results. A central processing unit is coupled to the plurality of digital results, wherein the central processing unit digitally performs beam forming and/or null steering. In some aspects of this embodiment, neighboring array elements are connected to each other and digital results are passed and combined from array element to array element. The combined results of chains of neighboring array elements are provided to the central processing unit for final demodulation.

In another embodiment, the present disclosure provides a multi-element transceiver for beamforming. The multi-element transceiver of this embodiment includes a plurality of transmit elements, each of the plurality of transmit elements including a transmit antenna, and a transmit processor coupled to the transmit antenna. The transmit processor is configured to receive bits to be transmitted, receive a transmit time offset, receive a transmit phase shift, and generate a modulated waveform based on the received bits, the transmit time offset and the transmit phase shift. The modulated waveform is coupled to the transmit antenna element. The multi-element transceiver further includes a plurality of receive elements, each of the plurality of receive elements including a receive antenna configured to receive a signal, and a receive processor coupled to the receive antenna. The receive processor is configured to demodulate the signal to generate baseband samples, wherein the demodulation is at least partially based on a receive time offset and a receive phase shift. The multi-element transceiver further includes a central processing unit configured to generate: a plurality of receive time offsets and receive phase shifts for the plurality of receive elements and a plurality of transmit time offsets and transmit phase shifts for the plurality of transmit elements. The plurality of receive time offsets include the receive time offset, the plurality of receive phase shifts include the receive phase shift, the plurality of transmit time offsets include the transmit time offset, and the plurality of transmit phase shifts include the transmit phase shift. The plurality of receive time offsets and receive phase shifts are configured to beamform with the plurality of receive elements, and the plurality of transmit time offsets and transmit phase shifts are configured to beamform with the plurality of transmit elements.

In yet another embodiment, the present disclosure provides a multi-element device for beamforming. The multi-element device of this embodiment includes a plurality of transmit elements, each of the plurality of transmit elements including a transmit antenna, and a transmit processor coupled to the transmit antenna. The transmit processor is configured to receive bits to be transmitted, receive a transmit time offset, receive a transmit phase shift, and generate a modulated waveform based on the received bits, the transmit time offset and the transmit phase shift, wherein the modulated waveform is coupled to the transmit antenna. The multi-element device of this embodiment further includes a central processing unit configured to generate a plurality of transmit time offsets and transmit phase shifts for the plurality of transmit elements, where the plurality of transmit time offsets and transmit phase shifts include the transmit time offset and the transmit phase shift, and the plurality of transmit time offsets and transmit phase shifts are configured to beamform with the plurality of transmit elements.

In yet another embodiment, the present disclosure provides a multi-element device for beamforming. The multi-element device of this embodiment includes a plurality of receive elements, each of the plurality of receive elements including a receive antenna configured to receive a signal, and a receive processor coupled to the receive antenna. The receive processor is configured to demodulate the signal to generate baseband samples, wherein the demodulation is at least partially based on a receive time offset and a receive phase shift. The multi-element device of this embodiment further includes a central processing unit configured to generate a plurality of receive time offsets and receive phase shifts for the plurality of receive elements, where the plurality of receive time offsets include the receive time offset, the plurality of receive phase shifts include the receive phase shift, and the plurality of receive time offsets and receive phase shifts are configured to beamform with the plurality of receive elements. The central processing unit is further configured to determine final baseband symbol values based on a combination of at least some of the baseband samples generated by the plurality of receive elements.

In yet another embodiment, the present disclosure provides a method of beamforming wireless signals across a plurality of array elements, the array elements being configured to adjust signal filtering parameters based on a plurality of time delays, the plurality of time delays being relative to a reference time. The method of this embodiment includes generating a plurality of time offsets and phase shifts for a plurality of receive elements, where the plurality of time offsets include a receive time offset for each receive element in the plurality of receive elements, the plurality of phase shifts comprise a receive phase shift for each receive element in the plurality of receive elements, and the plurality of receive time offsets and receive phase shifts are configured to beamform with the plurality of receive elements. The method further includes demodulating a signal with a processor coupled to a receive antenna of each of the plurality of receive elements, where the demodulating comprises demodulating the signal to generate baseband samples, where the demodulation is at least partially based on the receive time offset and the receive phase shift configured for the corresponding receive element. The method further includes combining the baseband samples from the plurality of receive elements to form a composite baseband sample, and determining a final baseband symbol value based on the composite baseband sample.

In yet another embodiment, the present disclosure provides a method of beamforming wireless signals across a plurality of array elements, the array elements being configured to adjust signal filtering parameters based on a plurality of time delays, the plurality of time delays being relative to a reference time. The method of this embodiment includes generating a plurality of time offsets and phase shifts for a plurality of transmit elements, where the plurality of time offsets including a transmit time offset for each transmit element in the plurality of transmit elements, the plurality of phase shifts including a transmit phase shift for each transmit element in the plurality of transmit elements, and the plurality of transmit time offsets being configured to beamform with the plurality of transmit elements. The method further includes processing bits to be transmitted with a transmit processor coupled to a transmit antenna of each of the plurality of transmit elements, the processing including sub-steps of receiving bits to be transmitted, receiving one of the transmit time offsets and one of the transmit phase shifts, and generating a modulated waveform based on the received bits, the one transmit time offset and the one transmit phase shift, wherein the modulated waveform is coupled to the transmit antenna.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

Figure 1:
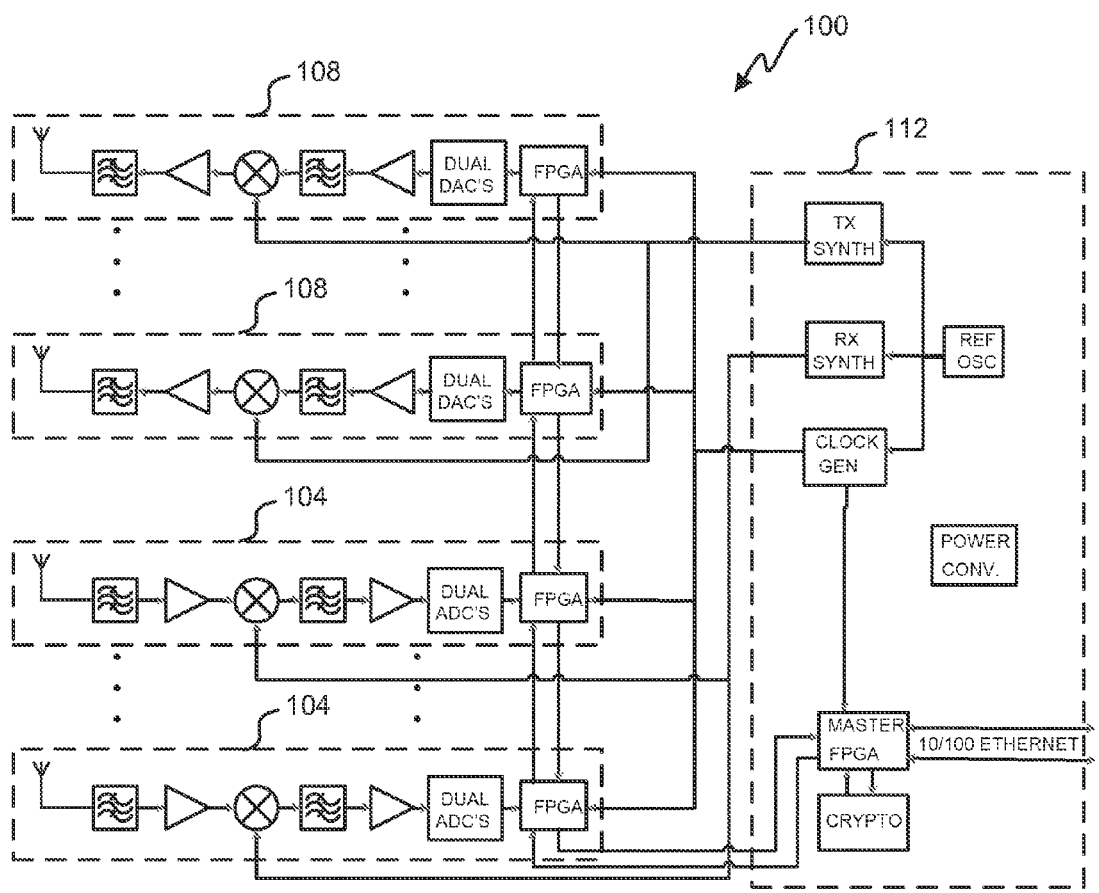
FIG. 1 depicts a block diagram of an embodiment of an electronically steerable array transceiver.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

In one embodiment, this invention reduces the cost, size, and weight of a digital data link and directional, steerable antenna by combining their functions in an efficient, flexible manner. The amount of functional integration and processing located at each active array element is unique. Further, producing a digital result at each active array element that is communicated to adjacent elements to implement distributed processing and combining, greatly reduces the amount of data that has to be moved to/from a central processing unit. In one embodiment, this distributed processing has benefits in that the load on the central processing unit does not change significantly as the size of the array is increased. In one embodiment, this invention allows the combining of a complete electronically steerable antenna and datalink into an externally-mountable antenna package that is not much larger than a typical passive antenna alone.

Because of the high amount of integration of one embodiment, a full transmit and receive datalink can be realized with a large majority of the circuitry contained within the structure of the antenna body. In airborne applications, this frees up space within the aircraft for other payloads. In many cases, embodiments eliminate the need for a mechanically steered antenna to save size, weight, cost, etc.

The distribution of most beamforming and datalink signal processing computations to computational nodes at each array element reduces the internal communications requirements, thereby reducing interconnect size and cost in embodiments. It also makes it easier to scale the number of array elements for different applications since the amount of computation in the central node stays relatively constant regardless of the number of array elements.

Embodiments include digital signal processing in each array element. By distributing some of the digital signal processing to each array element, true time delay processing can be applied independently at each element in the digital domain, thereby increasing the usable bandwidth even with arrays that have large linear dimensions.

In one embodiment of the invention, an electronically steerable array transceiver 100 is disclosed that uses distributed digital signal processing. FIG. 1 shows an embodiment of the electronically steerable array transceiver 100 that uses two or more transmit and two or more receive active array elements 108 and 104, respectively. Each of the active array elements 108 and 104 performs both beam-forming and datalink signal processing under the control of a central processing unit 112.

Various elements of the electronically steerable array transceiver 100 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, electronic devices, other electronic units, or a combination thereof.

Figure 2:
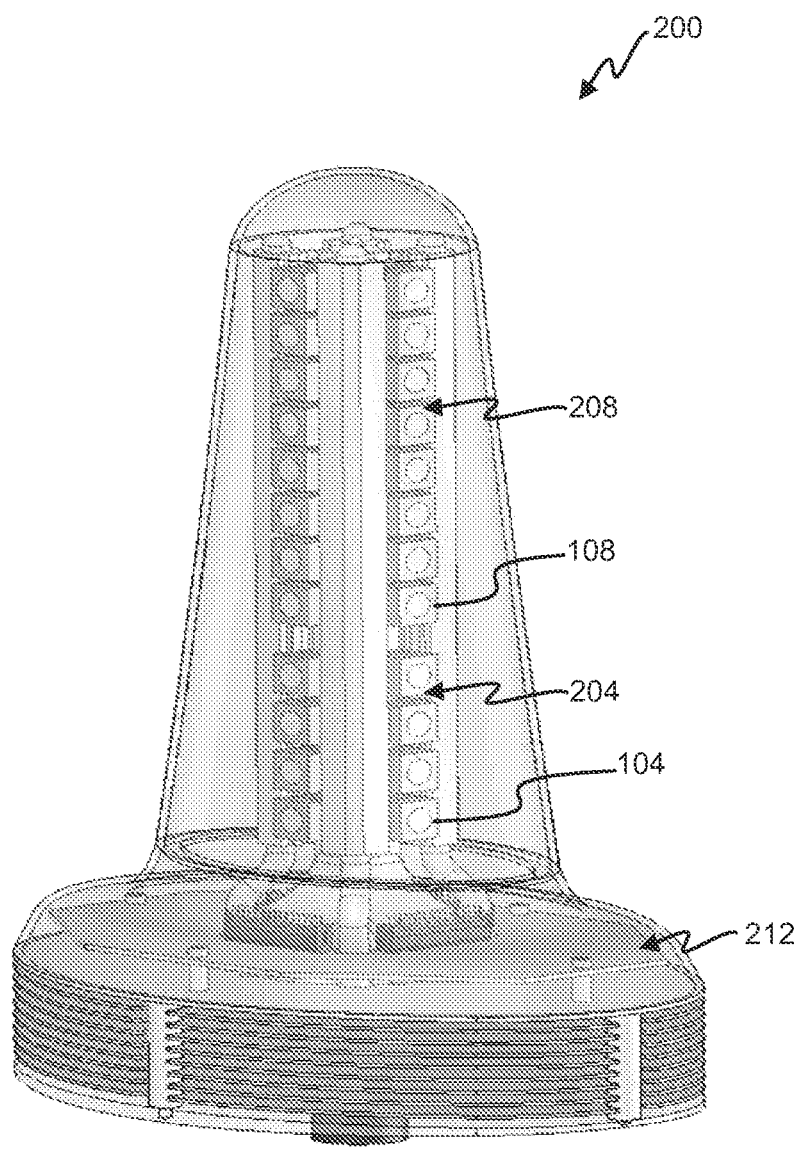
FIG. 2 illustrates a form factor of an embodiment of an electronically steerable array transceiver.

One embodiment integrates the electronically steerable array transceiver 100 into a blade-antenna form factor 200 shown in FIG. 2, but other form factors such as conformal, cylindrical, linear, or planar are possible. This embodiment has four transmit arrays 208 with each having eight active transmit array elements 108, and four receive arrays 204 with each having four active receive array elements 104. In the receiving array 204 of receive active array elements 104, the output of each array element 104 is filtered, amplified, I-Q down converted and dual A/D conversion-sampled with the active array element 104. The various transmit and receive arrays 208, 204 communicate with the central processing unit 112, which is implemented at the base of the blade-antenna form factor 200 with central computer circuit card 212. Preferably, each receive array element 104 communicates with adjacent receive array elements 104, and the receive array element 104 nearest the central processing unit 112 communicates with the central processing unit 112. The antenna arrays 204 and 208 are one-dimensional arrays comprising a single column of array elements 104 and 108. However, other antenna arrays can have two-dimensional form factors such as planar arrays (in various shapes such as rectangular, circular, triangular, annular, etc.), and yet other antenna array embodiments can have three-dimensional form factors such as spherical, pyramidal, conical, etc.

Collocated at each at each receive active array element 104, a signal processor accepts the digital representation of the I/Q signals and operates on a digitally modulated signal (e.g. an OQPSK-modulated signal) to begin the demodulation and beamforming process. An FPGA and/or ASIC can be used to implement the signal processor. The signal processor performs the carrier phase and frequency shifting, matched filtering, time delay, and combines its data with data from an adjacent active array element 104. Data combining is accomplished using a systolic computation process (one or two-dimensional) that adds each element's contribution as the data moves from one active array element 104 to another active array element 104 in a daisy-chain fashion.

A single combined demodulated stream of data is passed to the central processing unit 112. The central processing unit 112 is in the same housing as the antenna package and implemented with central processing circuit cards 212. Here, the added processing to acquire & track the RF carrier frequency and phase, track data timing, and other salient waveform characteristics is accomplished by the central processing unit 112 passing control information back to the receive array elements 104 in one embodiment.

The transmit active array elements 108 take digital data and control information forwarded from the central processing unit 112 in a daisy-chain fashion, and operate generally in the reverse of the receive active array elements 104, producing digital modulation (such as OQPSK), and I-Q modulating an RF carrier by direct conversion, amplifying and filtering the result, then presenting the result to the array antenna element. Other embodiments could use a star configuration rather than a daisy-chain for the array elements 104, 108. The electrical phase, time delay, and amplitude of the radiating signal at each transmit active array element 108 is controlled around the transmit array 208 in such a manner as to control the direction(s) and shape(s) of the beam(s) and/or milks). In this embodiment, multiple beams/nulls can be produced in the receive and/or transmit arrays.

Figure 3:
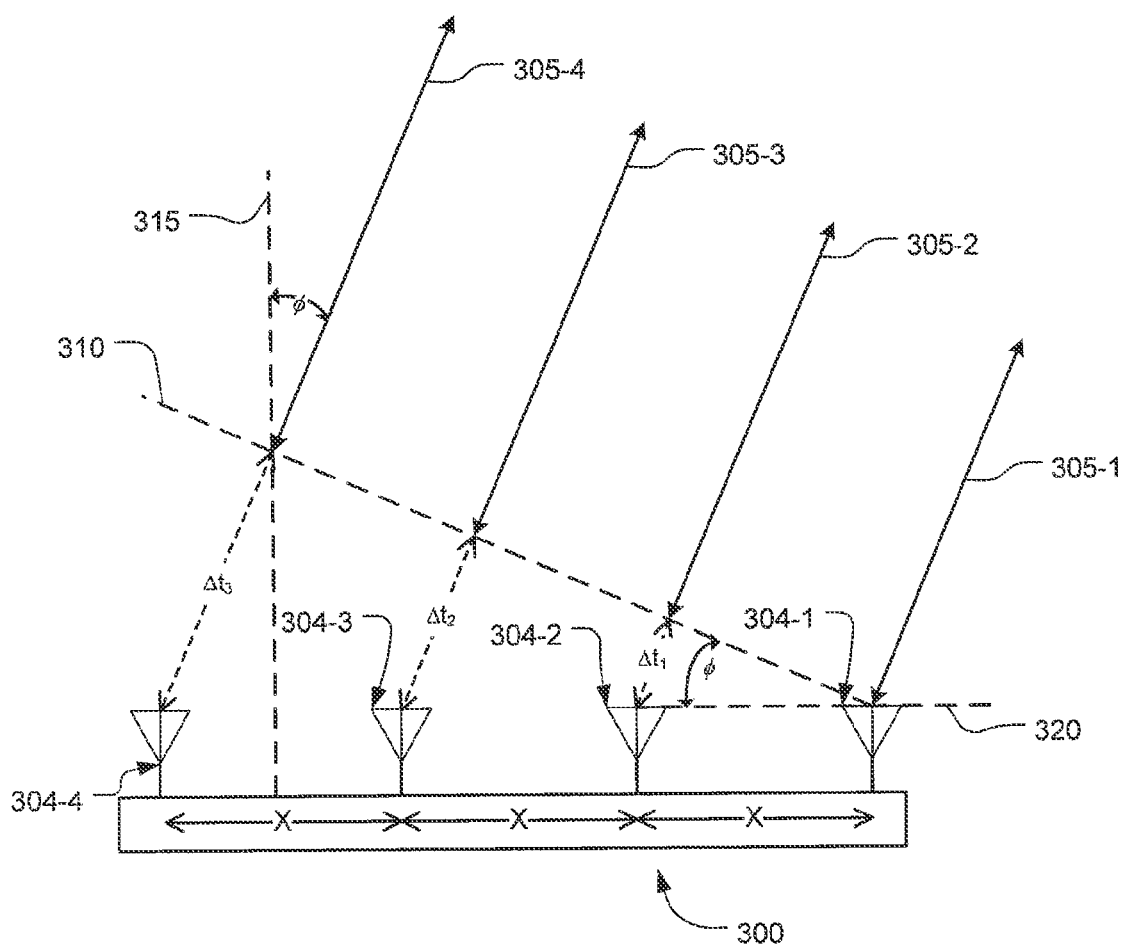
FIG. 3 illustrates an example of beamforming with a one-dimensional electronic steerable array using time delays.

An example of beamforming using time delays is now discussed. Referring to FIG. 3, an embodiment of a one-dimensional transceiver array 300 includes four transceiver array elements 304-1 through 304-4. The transceiver array 300 contains four transceiver elements 304 which each contain a receive array element 104 and a transmit array element 108. This is done for simplicity in order to discuss beamforming of both transmitted and received signals in reference to the same figure. However, similar methods may be used for beamforming separate transmit arrays and receive arrays that are spatially separated such as illustrated in FIG. 2.

The transceiver elements 304 are each separated from each other by a distance "X" in this example. A signal 305, which can be a received and/or transmitted signal, is beamformed at an angle "ø" from line 315 that is orthogonal to the plane of the array 300. The signal 305 is illustrated as including four sub-signals 305-1 through 305-4 that are incident with the transceiver elements 304-1 through 304-4, respectively.

The line 310 is at an angle "ø" in relation to the plane of the antenna array 300 the portion of the sub-signals 305 that are coincident with the line 310 were all transmitted at the same time from a signal source at the angle "ø" in relation to the antenna array 300, in the case of a received signal. As can be seen, the sub-signal 305-1 is received first by the transceiver element 304-1 then sub-signal 305-2 is received by the element 304-2 (at a time $\Delta t_1$ later than the sub-signal 305-1 was received), then sub-signal 305-3 is received by the element 304-3 (at a time $\Delta t_2$ later than the sub-signal 305-1 was received), and finally sub-signal 305-4 is received by the element 304-4 (at a time $\Delta t_3$ later than the sub-signal 305-1 was received).

The time delays $\Delta t_1$ through $\Delta t_3$ are a function of the distance "X" between the transceiver elements 304 and the angle "ø" of the beamformed signal 305. The delay times can be computed by calculating the time it takes for a radio signal to travel the distance between the line 310 and the transceiver element 304. For example, signal 305-2 will be received at the element 304-2 at a time $\Delta t_1 = X \sin(ø)/c$, where "c" is the speed of light, later than the signal 305-1 was received at the element 304-1. Thus, in order to receive the signal 305 that is at an angle ø, element 304-2 is delayed by $\Delta t_1 = X \sin(ø)/c$ relative to element 304-1, element 304-3 is delayed by $\Delta t2 = 2X \sin(ø)/c$ relative to element 304-1, and element 304-4 is delayed by $\Delta t_3 = 3X \sin(ø)/c$ relative to element 304-1.

In the case of beamforming a transmitted signal 305 at the angle ø, element 304-4 transmits first, element 304-3 is delayed by $\Delta t_1 = X \sin(ø)/c$ relative to element 304-4, element 304-2 is delayed by $\Delta t2 = 2X \sin(ø)/c$ relative to element 304-4, and element 304-1 is delayed by $\Delta t_3 = 3X \sin(ø)/c$ relative to element 304-4. Other more complicated methods of beamforming can be used in addition to the simple example discussed here. For example, different elements can be spatially weight depending on their relative positions to each other to focus and/or shape the beam in various ways.

If time delays $\Delta t$ are implemented directly on the RF signal, then the phase of the signals will also be correct. However, in cases where the baseband signals are delayed, a phase correction is also used to synchronize the phases of the signals at the elements 304.

The example array 300 has equally space elements located on the same plane. This configuration simplified the explanation of how to compute delay times. However, the elements 304 need not be equally spaced and the array can take on other shapes and sizes that are not in the same plane. A two-dimensional array could be used to beamform in two dimensions simultaneously.

Figure 4:
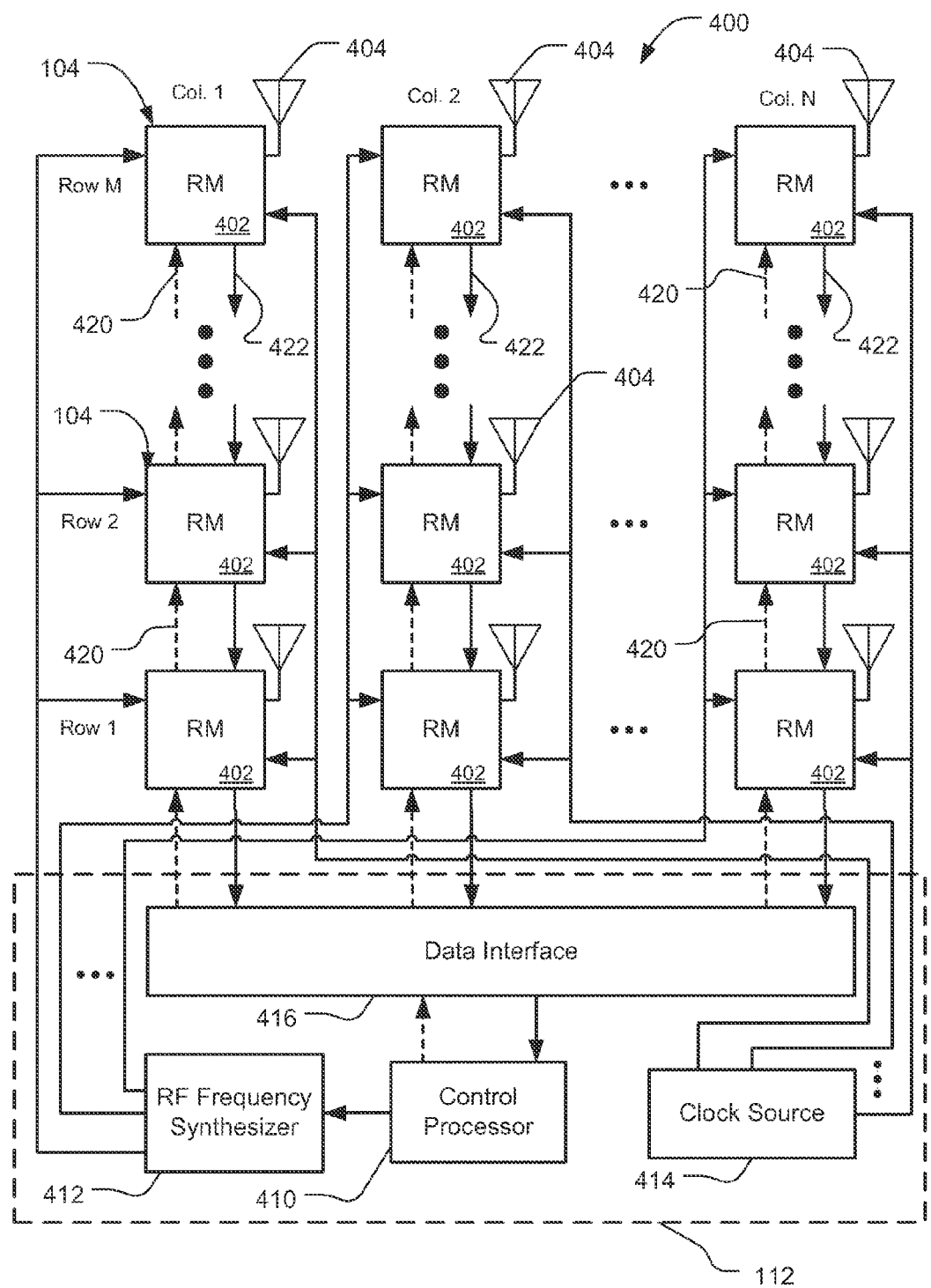
FIG. 4 depicts a block diagram of an embodiment of a two-dimensional receive antenna array utilizing distributed signal processing for digital beamforming.

Referring to FIG. 4, an embodiment of a two-dimensional receive antenna array system 400 includes the central processing unit 112 and M rows and N columns of receive array elements 104. Each receive array element includes a receive module (RM) 402. The central processing unit 112 includes a control processor 410, an RF synthesizer module 412 clock source 414, and a data interface 416.

For the receive array elements 104, the control processor 410 is configured to produce data relayed through the data interface 416 to all the receive array elements 104 to beamform, tune and otherwise control the two-dimensional receive antenna array system 400. The control processor 410 could be a microprocessor, microcontroller, FPGA, or a signal processor that process and store the data on memory (not shown). The memory can be implemented within the control processor 410 or external to the control processor 410. The memory may be long term, short term, volatile, nonvolatile, or another type of memory and is not limited to any particular type of memory or number of devices.

The RF frequency synthesizer 412 supplies one or more carrier frequency waveforms to all the receive array elements 104. The control processor 410 manages the RF synthesizer 412 to supply certain frequencies to certain array elements 104 or groups of array elements such that certain beamformed signals are received on certain frequencies. Various signal diversity schemes could be used such as TDMA, CDMA, OFDM, FDM, etc.

The clock source 414 supplies reference time pulses to the receive modules 402 of each of the receive array elements 104 in order to maintain synchronization. The clock signal can be in the form of a square wave or some other cyclical signal. Each of the receive modules 402 in the antenna array system 400 receive a function of the same clock signal such that they are generally synchronized in one embodiment, two clock signals are utilized. A first of the two clock signals is used for running the ADCs, the DAC's and the FPGA's of the control processor 410. The second of the two clock signals in this embodiment is used to unambiguously identify a particular clock cycle of the first clock signal. The period of the second clock signal is longer than the longest delay experienced in the array, including the daisy chain delay. In this way, all the elements of the array can be properly synchronized.

The data interface 416 communicates data between the receive array elements 104 and the control processor 410. The data interface 416 receives demodulated data from the receive array elements 104 and communicates the demodulated data to the control processor 410. In cases where a beamforming group includes receive array elements 104 from multiple columns, the data interface 416 combines those samples that correspond to the same demodulated samples. In this way, the samples relayed from each column are meaningfully combined. The combined samples are then communicated to the control processor 410.

In addition to receiving demodulated data samples, the data interface 416 receives status information from the receive array elements 104. The status information is then communicated to the control processor 410. The status information can include received signal strength measures, element temperatures, test measurements, etc.

The data interface 416 also distributes control data to the receive array elements 104 in their respective columns. The control data includes beamforming information, including time offsets, frequency offsets, data rates, etc.

Each of the receive array elements 104 includes a receive module 402 and a receive antenna 404. The receive module 402 contains a processor coupled to the receive antenna 404. The processor of the receive module 402 is configured to perform demodulation of the signals received via the antenna 404. The receive module 402 receives beamforming time delay information and other control information from the control processor 410 via input lines 420 (shown as dashed lines). The receive modules 402 in each column are arranged in daisy chain fashion and each receive module 402 forwards the time delay information to the next receive module 402 in the column.

The receive modules 402 in each column are also coupled via output lines 422. Preferably, the receive modules 402 are configured to demodulate the received signals such that baseband samples result at each receive module 402. In one embodiment, the baseband samples are multi-bit signed (positive and negative values) complex measures (e.g., output from an interpolating matched filter) correlated to the strength of the received beamformed signal. The baseband samples are preferably decimated to a minimum sample rate to support demodulation of the modulated symbol waveform. The baseband samples of one receive module 402 are sent to the next receive module 402 in the column via one of the output lines 422. The next receive module 402 then combines the received baseband samples with the baseband symbols that resulted from its own demodulation. The last receive module 402 in the column then sends the combined baseband samples to the data interface 416. The data interface 416 then combines all the combined baseband samples from all the columns. The final combined baseband samples are then sent to the control processor 410 for final demodulation using soft decision Viterbi decoding).

The control processor 410 is configured to determine the receive time delay, phase, and amplitude weight (amplitude weighting is optional) information that are supplied to the receive modules 402 to beamform the receive array elements 104. Any number of receive array elements can be used to beamform. Multiple beams can be received with different array element groups. In addition, multiple beamformed signals can be received by the same group of receive array elements 104 by performing the signal processing functions twice on the same received signal with different receive: time delay offsets.

The control processor 410 is configured to determine the receive delay times of the receive array elements 104 in rows to differ by certain times to beamform a received signal corresponding to a certain angle of rotation about an axis that is orthogonal to the rows. The control processor 410 is also configured to determine the receive delay times of the receive array elements 104 in columns to differ by times to beamform a received signal corresponding to a certain angle of rotation about an axis that is orthogonal to the columns. In this way the e two-dimensional planar array 400 can beamform any signal within a conical region. Examples of delay time computations are discussed above in reference to FIG. 3 above.

Figure 5:
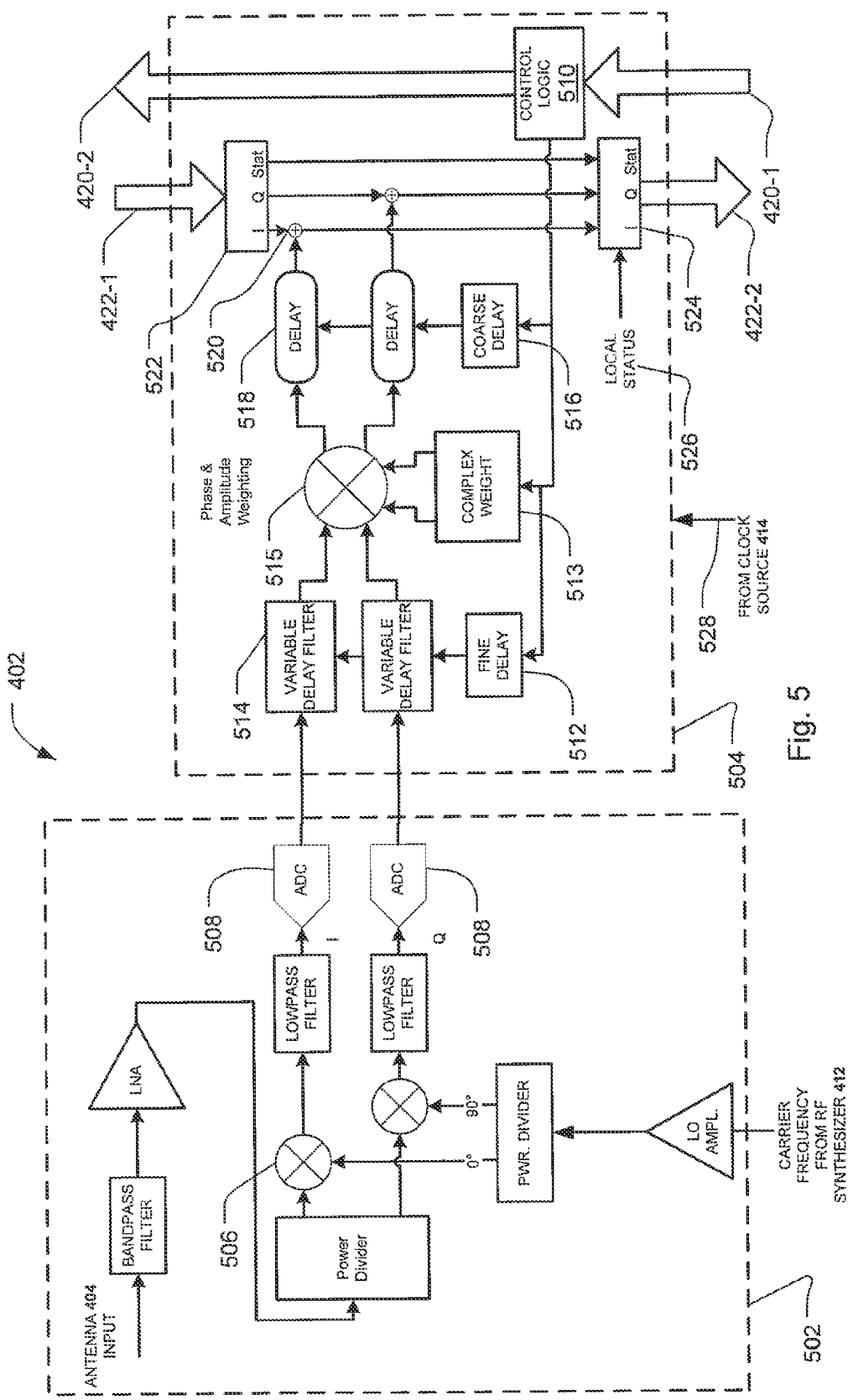
FIG. 5 depicts a block diagram of an embodiment of a receive antenna processing module used in the two-dimensional receive antenna array of FIG. 4.

Referring to FIG. 5, an embodiment of the receive module 402 of FIG. 4 includes two main demodulation portions, namely, an analog demodulation portion 502 and a digital demodulation portion 504. The analog demodulation portion 502 includes various filters, power dividers, amplifiers, multipliers 506, and analog-to-digital converters (ADC) 508. The analog demodulation portion 502 receives an input signal from the antenna 404 of the corresponding receive array element 104 that includes the receive module 402. The analog demodulation portion 502 also receives a carrier frequency input waveform from the RF synthesizer 412. In the embodiment shown in FIG. 5, the analog signal is modulated with dual EQ symbols (e.g., OQPSK) which are down converted, filtered and dual A/D conversion-sampled. The digital I-Q symbols are input to the digital demodulation portion 504.

The digital demodulation portion 504 comprises a signal processor implemented in a FPGA in this example (other embodiments can include a DSP, a DSPD or a PLD) which receives the digital representation of the down converted I/Q signals from the ADCs 508 and operates on a digitally modulated signal (e.g. a OQPSK-modulated signal) to perform the remaining demodulation and beamforming process. Control logic module 510 receives control information (e.g., receive time offsets, data rates, beam group identifiers, etc.) over the input data line 420-1 from the control processor 410 of the central processing unit 112 of FIG. 4. The input data line 420-1 is either coupled directly to the central processing unit 112 or to another receive module 402, depending on where in the receive antenna array system 400 the particular receive module 402 is located.

The control logic module 510 communicates the control information that is needed by the other modules 402 in the same column via an output data line 420-2. In addition, the control logic module 510 forwards the control information to other receive modules 402 via the output data line 420-2. The control logic module receives control information from the control processing unit 112. The control information can include information related to tracking algorithms including a carrier phase tracking loop, a symbol timing tracking loop, and a signal angle-of-arrival (AOA) tracking loop that are all performed by the control processor 410, in one embodiment.

The AOA tracking loop (if one is used) can be conical scan or dither scan, and can be based on a separate beam to avoid degrading the primary beam.

The digital demodulation portion 504 also includes subsystems for Doppler removal and phase and amplitude weighting of the modulated I/Q signals. The Doppler removal subsystem includes a phase accumulator and a SIN/COS lookup module that, using frequency offset and phase offset information received from the central processing unit 112 via the control logic module 510, compensate for the Doppler frequency offset resulting from differences in velocity of the transmitter and receiver. The phase and amplitude weighting subsystem includes a complex weight module that, using phase shift and weighting control information received from the control logic module 410, adjust the phase and amplitudes of the down converted I/Q signals.

The beamforming functions performed by the digital demodulation portion 504, are carried out by a fine delay module 512 two variable delay filters 514, a complex weight module 513, a complex multiplier 515 and a coarse delay module 516. The fine delay module 512 receives a specific receive time delay from the control logic module 510, where the specific receive time delay was determined by the central processing unit 112 in order to beamform a group of array elements. The fine delay is a portion of the overall delay used for beamforming the received signal and is a fraction of a sample time. The fine delay module 512 determines the proper interpolated matched filter coefficients, based on the specific received fine time delay, and provides these to the two variable delay filter modules 514. Preferably, the variable delay filters 514 are interpolating matched filters. The coefficients of the variable delay filters 514 are based on an oversampled representation of the desired impulse response of the desired filter. The chosen coefficient set depends on the relationship between the symbol rate and the sample rate, as well as the fine delay time. The output of the variable delay filters 514 are I/Q baseband sample measures resulting from the interpolated matched filer computations. In one embodiment, each of the baseband samples is a complex pair of 16 bit numbers, but other numbers of bits can be used.

Since the time delays are being implemented in the baseband domain, the phases of the signals are compensated for using the complex weight module 513 and the complex multiplier 515. In some embodiments, the complex weight also modifies the amplitude of the received signals for further shaping of the beamformed signal. The complex weights are determined by the central processing unit 112.

The time delays for beamforming are achieved in the time domain using a combination of whole sample delays via FIFO's and the coarse delay module 616 and fractional sample delays via the fine delay module 512 and the time interpolation capability of the variable delay filters 514. The delay provided by the coarse delay module 516 and the delay registers 518 also compensates for processing delays of other receive modules 402, namely those receive modules 402 that lie upstream in the antenna array system 400. The coarse time delay is an amount of time that the current receive module 402 holds samples in a FIFO until the input data line 422-1 presents I/Q baseband symbols included in an input data message 522 received from an upstream receive module 402 representing the same sample time. The I/Q baseband samples computed by the variable delay filters 514 of the current receive module 402 are added to the I/Q samples received from the other receive module 402 and the combined I/Q baseband symbols are forwarded in an output data message 524 to the next receive module 402 via an output data line 422-2.

In addition to forwarding the combined baseband symbols in the output data message 524, the receive module 402 can also provide various local status measures 526 reflecting various characteristics of the receive module 402. The local status measures 526 are forwarded to the central processing unit 112 via the output data line 422-2. The local status measures can include a received power level measure, a temperature measure of the associated receive array element 104 and other measures that can be used by the central processing unit 112 for diagnosing health status of an array element, for determining which array elements to include in a beamforming group of array elements, etc. If the input data message 522 included any local status messages from other receive modules 402, these local status messages are also forwarded in the output data message 524.

The digital demodulation portion 504 receives a clock signal 528 from the clock source 414. The clock signal can be in the form of a square wave and actions can be enabled on the rising or falling edges or both. Each of the receive modules 402 in the antenna array system 400 receive the same clock signal 528 such that they are synchronized. In this way, the delay times are also synchronized to the same reference time thereby enabling the beamforming. Known delays in the clock arriving at and individual element is corrected for by the control processor 410 of the central processing unit 112 via the messages that set the receive sample time delay.

Figure 6:
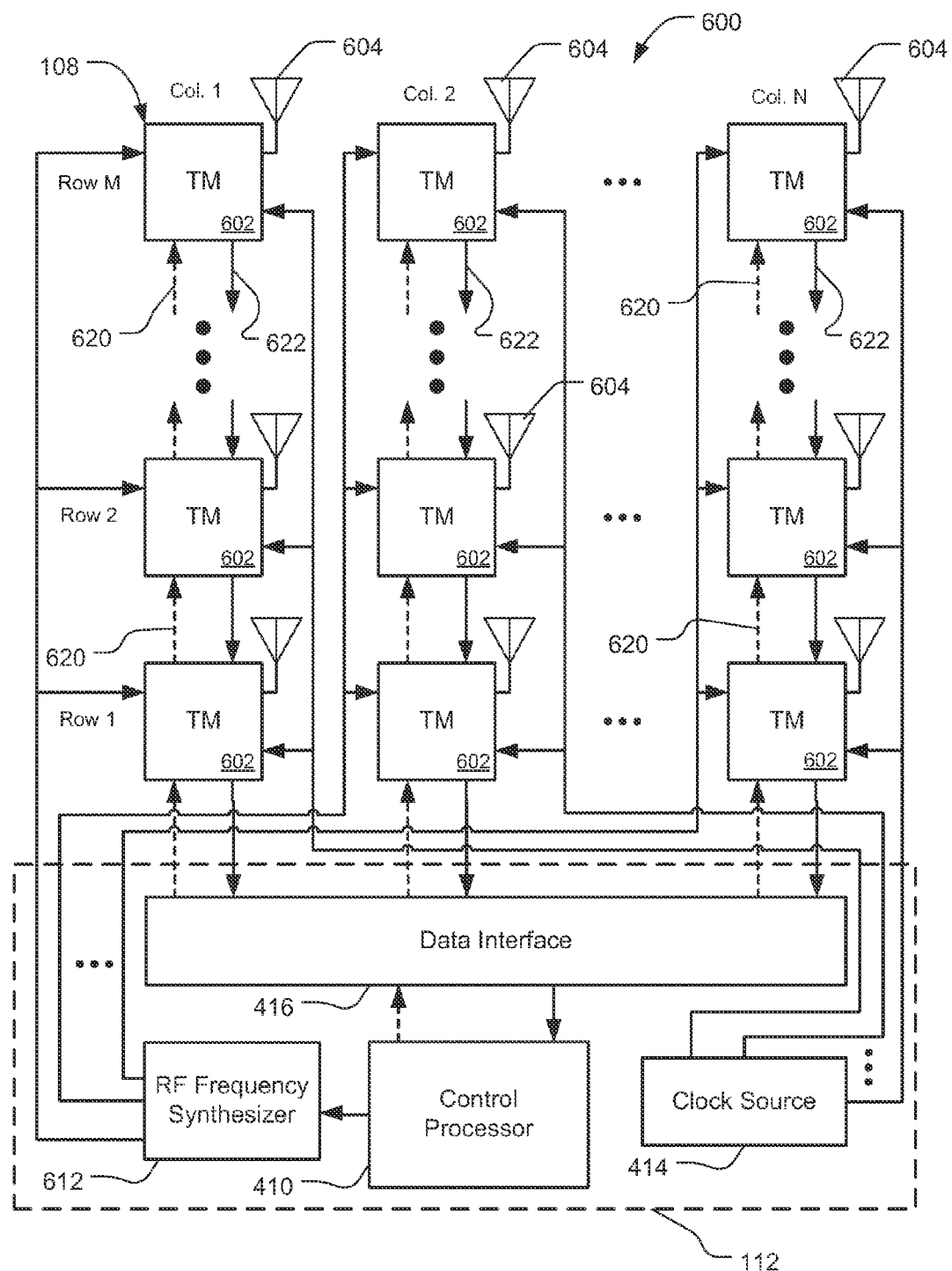
FIG. 6 depicts a block diagram of an embodiment of a two-dimensional electronically steerable transmit antenna array utilizing distributed signal processing for digital beamforming.

Referring to FIG. 6, a two-dimensional transmit antenna array system 600 includes central processing unit 112, M rows and N columns of transmit array elements 108. In the embodiments illustrated in FIGS. 4 and 6, the central processing unit 112 is the same for both the receive antenna array system 400 and the transmit antenna array system 600. Alternatively, the transmit and receive antenna array systems could have separate central processing units. The central processing unit 112 includes a control processor 410, an RF frequency synthesizer module 612, a clock source 414 and a data interface 416. In one embodiment, the RF frequency synthesizer module 612 is different than the RF synthesizer module 412 of the receive array and utilizes a different radio frequency for providing in duplex communications. In another embodiment, the RF frequency synthesizer module 612 is the same as the RF synthesizer module 412 and half-duplex communications are used.

The control processor 410 is configured to communicate data to be transmitted by the transmit array elements 108, as well as control information (e.g., beamforming transmit delay times, complex weights, antenna group identifiers, etc.) to the data interface 416. The control processor 410 uses memory to store the transmit data and the control information. The memory can be implemented within the control processor 410 or external to the processor 410. The memory may be long term, short term, volatile, nonvolatile, or another type of memory and is not limited to any particular time of memory or number of devices.

The RF Synthesizer 612 supplies one or more carrier frequency waveforms to the transmit array elements 108. The control processor 410 controls the RF synthesizer 612 to supply certain frequencies to certain array elements or groups of array elements such that certain beamformed signals are transmitted on certain frequencies.

The clock source 414 supplies reference time signals to the transmit array elements 108 in order to maintain synchronization. The clock signal can be in the form of a square wave. Each of the transmit array elements 108 in the antenna array system 600 receive the same clock signal such that they are synchronized.

The data interface 416 communicates data between the transmit array elements 108 and the control processor 410. The data interface 416 receives data to be transmitted from the control processor 410 and communicates the data to be transmitted to the proper columns of transmit array elements 108. The data interface 416 also distributes control data to proper columns of transmit array elements 108. The control data includes beamforming information, including time offsets, complex weights, frequency offsets, data rates, etc.

In addition to forwarding data to the transmit array elements 108, the data interface 416 receives status information from the transmit array elements 108. The status information is then communicated to the control processor 410. The status information can include received signal strength measures, element temperatures, etc.

Each of the transmit array elements 108 includes a transmit module 602 and a transmit antenna 604. The transmit module 602 contains a processor coupled to the transmit antenna 604. The processor of the transmit module 602 is configured to perform modulation of data bits received from the data interface 416. The transmit module 602 also receives beamforming time delay, phase shifts (complex weights), and optional amplitude weight information as well as other control information from the control processor 410 via input data lines 620 (shown as dashed lines) and the data interface 416. The transmit modules 602 in each column are arranged in daisy chain fashion and each transmit module 602 forwards the control information and the data to be transmitted to the next transmit module 602 in the column.

The transmit modules 602 in each column are also coupled via output lines 622. The transmit modules 602 communicate the status information discussed above to the next transmit module 602 and eventually to the data interface 416 via the output lines 622.

The control processor 410 is configured to determine the receive time delay, phase shifts (complex weights), and optional amplitude weight information that is supplied to the transmit modules 602 to beamform the transmit array elements 108. Any number of transmit array elements 108 can be used to beamform. Multiple beams can be transmitted with different array element groups. In addition, all the array elements can be used together to beamform multiple beamformed signals simultaneously where the multiple signals are combined. However, the combined signals are analyzed to verify that the peak power capability of any of the transmit array elements 108 are not exceeded, thereby avoiding clipping.

The control processor 410 is configured to determine the transmit delay times and phase shifts (provided by complex weights) of the transmit array elements 108 in rows to differ by certain times to beamform a transmitted signal. The control processor 410 is also configured to determine the transmit delay times of the transmit array elements 108 in columns to differ by times to beamform a received signal. In this way, the two-dimensional array 600 can beamform any signal within a conical region. Examples of delay time computations are discussed above in reference to FIG. 3. The objective is to provide delays and phase shifts such that the signals from all elements will arrive at a plane perpendicular to the desired beam, at the same time and phase. Amplitude weightings, using the complex weights, can also be used to control sidelobes.

Figure 7:
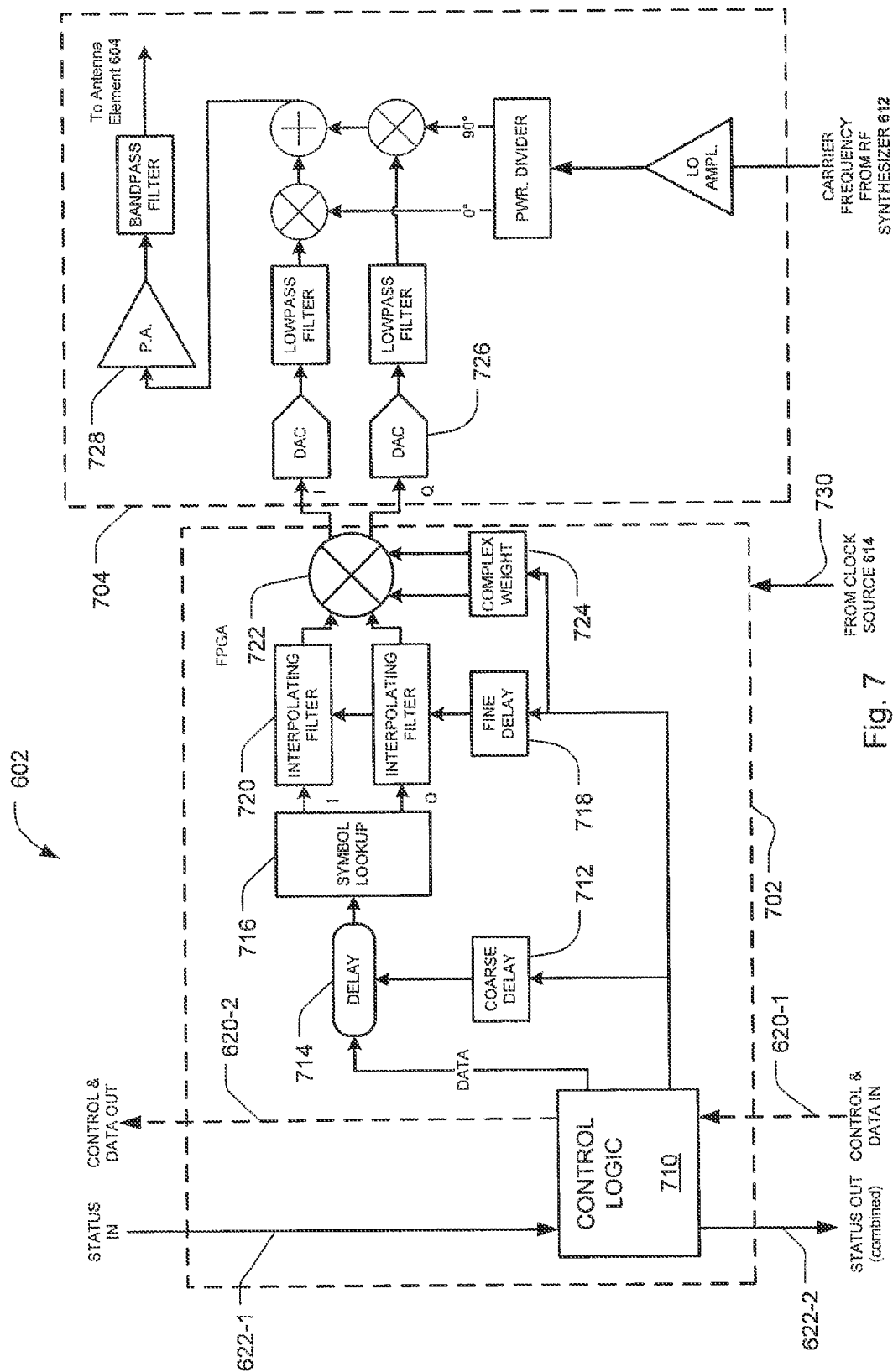
FIG. 7 depicts a block diagram of an embodiment of a transmit antenna processing module used in the two-dimensional transmit antenna array of FIG. 6.

Referring to FIG. 7, an embodiment of the transmit module 602 of FIG. 6 that includes two main modulation portions, namely, a digital modulation portion 702 and an analog modulation portion 704 is shown. The digital modulation portion 702 comprises a signal processor that is implemented with a FPGA in this example (other embodiments can include a DSP, an ASIC, a DSPD or a PLD). Control logic module 710 receives data to be transmitted (e.g., bits) and control information (e.g., receive time offsets, complex weights, data rates, beam group identifiers, etc.) over an input data line 620-1 from the control processor 410 of the central processing unit 112 of FIG. 6. The input data line 620-1 is either coupled directly to the central processing unit 112 or to another transmit module 602, depending on where in the transmit antenna array system 600 the transmit module 602 is located.

The control logic module 710 communicates data to be transmitted to the delay register 714. The control logic module 710 also communicates the control information to the other modules in the transmit module 602. In addition, the control logic module 710 forwards the data to be transmitted and the control information to other transmit modules 602 via the output data line 620. The central processing unit 112 includes tracking algorithms including a carrier phase tracking loop and a bit timing tracking loop. The central processing unit 112 uses these tracking loops in determining the proper delay times and phase shifts.

The control logic module 710 receives status information from another transmit module 602 via input status line 622-1. The control logic module 710 provides various local status measures reflecting various characteristics of the transmit module 602. The local status measures are combined with those of other transmit modules 602 and forwarded to the central processing unit 112 via the output status line 622-2. The local status measures can include, for example, a received power level measure, a temperature measure of the associated transmit array element 104 and other measures that can be used by the central processing unit 112 for diagnosing health status of an array element, e.g., for determining which array elements to include in a beamforming group of array elements.

The data in the delay register 714 is delayed until a course delay module 712 enables the delay register 714 to transfer bits, two at a time in this embodiment, to a symbol lookup module 716. The coarse delay module 712 receives the coarse delay from the control logic module 710, where the coarse delay was determined by the central processing unit 112. The delay provided by the coarse delay module 712 and the delay register 714 is related to beamforming the transmitted signals as well as compensating for processing delays of other transmit modules 602 and the transfer time needed for the data bits and control information to reach the last transmit module 602 in the columns. The beamforming portion of the coarse time delay is made up of one or more full sample time periods whereas a fine time delay portion is a fraction of the sample time period. The coarse time delay is an amount of time that the current transmit module 602 delays modulating the data to be transmitted.

The fine time delay beamforming functions are performed by a fine delay module 718 and two interpolating filter modules 720. The fine delay module 718 receives a specific fine transmit time delay from the control logic module 710, where the specific transmit time delay was determined by the central processing unit 112 in order to beamform a group of array elements. The fine delay module 718 determines the proper interpolated filter coefficients, based on the specific transmit time delay, and provides these to the two interpolating filter modules 720. In one embodiment, a lookup table includes pre-stored interpolated modulation waveforms for several fine time delays up to a delay equal to the sample time period.

The interpolating filters 720 filter symbols (e.g., OQSPK symbols) received from the symbol lookup module 716. The interpolating filters 720 output the filtered symbols to a multiplier 722. The multiplier 722 receives a complex weight parameter from a complex weight module 724. The complex weight module 724 receives the complex weight parameter from the control logic module 710 which in turn receives it from the control processor 410 via the data interface 416. The multiplier 722 performs a complex multiplication on the symbols and the complex weight parameter and provides the output to digital to analog converters 726 of the analog modulation portion 704. The complex weight parameter is determined by the central processing unit 112 to provide a certain phase shift and amplitude weighting for focusing and/or shaping the beam.

The digital modulation portion 702 receives a clock signal 730 from the clock source 414. The clock signal 730 can be in the form of a square wave and actions can be enabled on the rising or falling edges or both. Each of the transmit modules 602 in the antenna array system 600 receive the same clock signal 730 such that they are synchronized. In this way, the delay times are also synchronized to the same reference time thereby enabling the beamforming.

The analog modulation portion 704 includes various filters, a power divider, multipliers, and power amplifier 728. The analog modulation portion 704 receives a carrier frequency input waveform from the RF synthesizer 412. The carrier waveform is divided and modulates both the low pass filtered I and Q symbols which are then combined, amplified, band-pass filtered and provided to the antenna element 604 for transmission.

The power amplifier 728 can be a fixed or variable strength power amplifier. By having a power amplifier 728 at each of the transmit modules 602, the overall gain of the transmit array is increased. In addition, the cost of multiple smaller power amplifiers 728 could be less than the cost of a larger power amplifier coupled to all the antenna elements. In addition, the heat output of the distributed power amplifiers 728 is also distributed, possibly allowing for more efficient cooling.

Figure 8:
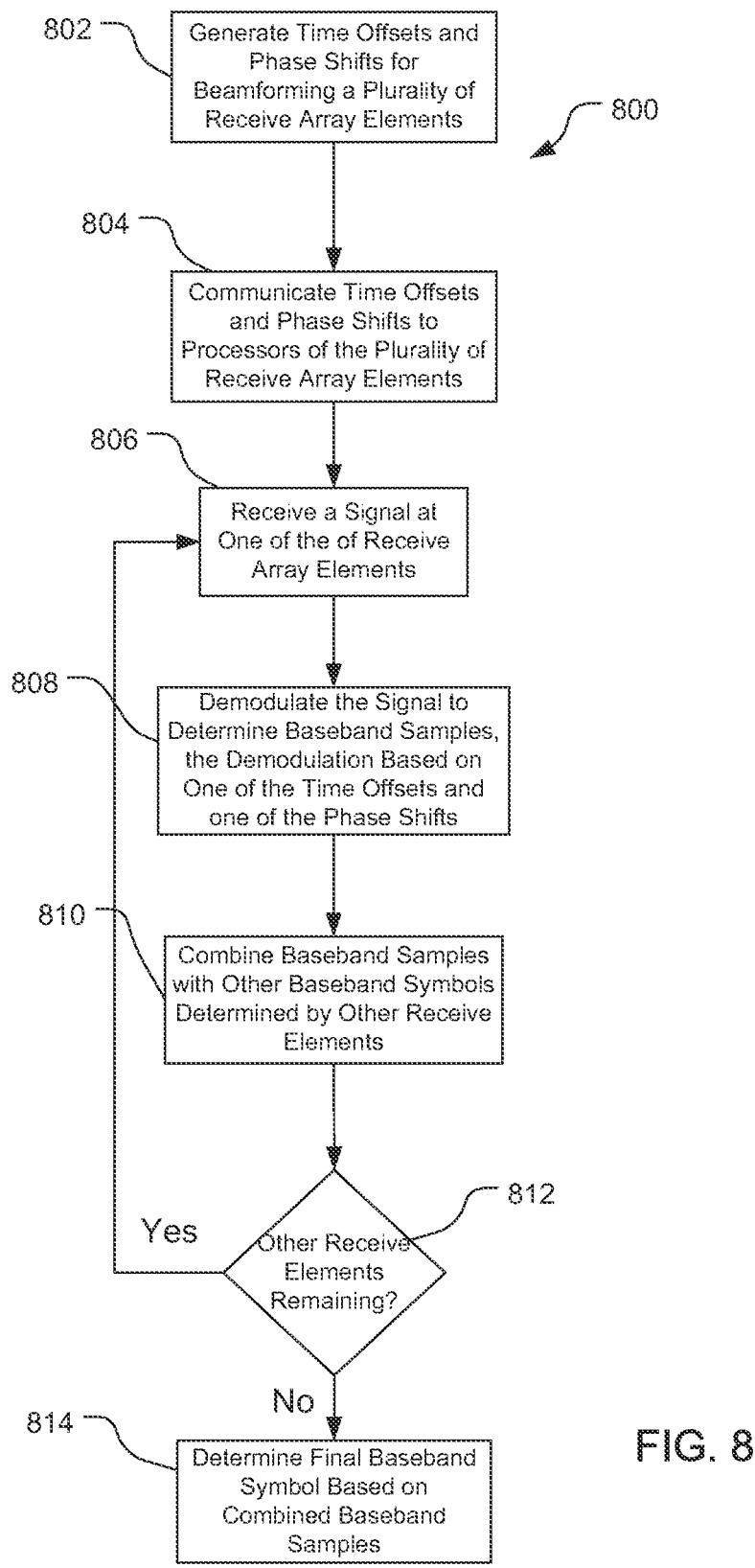
FIG. 8 depicts a flow diagram of an embodiment of a process for beamforming wireless signals across a plurality of receive array elements.

Referring to FIG. 8, an embodiment of a process 800 that is performed by the central processing unit 112 and the receive modules 402 of the receive antenna array system 400 of FIGS. 4 and 5 includes the blocks shown. At block 802, the control processor 410 generates receive time offsets (both the fine delay time and the coarse delay time discussed above and phase shifts (using the complex weights) for beamforming a plurality of the receive array elements 104. The receive time offsets and phase shifts can be for beamforming a one-dimensional array, for beamforming a two-dimensional array, or for beamforming any other array configuration.

In addition to generating receive time offsets and phase shifts (via the complex weights), the control processor 410 can also generate the complex weights to modify the amplitudes of the received signal to further shape and/or focus on a particular beam to be received.

At block 804, the control processor 410 communicates the receive time offsets and complex weights, and any other control parameters generated at block 802, to the receive modules 402 via the data interface 416. The control parameters received by the data interface 416 include information identifying the beamforming groups, individual antennas and/or columns of antennas with which the beamforming parameters are associated. Using this antenna identifying information, the data interface 416 communicates the control information via the appropriate input lines 420 to the receive modules 402.

Upon receiving the receive time offsets and complex weights that were communicated at block 804, a first of the receive array elements 104 (e.g., one of the receive array elements 104 furthest away from the data interface 416) receives a signal via the antenna element 404. Upon receiving the signal, a receive processor of the receive module 402 demodulates the signal, at block 808, to determine baseband samples. The demodulation is based on one of the receive time offsets and complex weights generated by the control processor 410 at block 802. The demodulation includes both analog demodulation performed by the analog demodulation portion 502 and digital demodulation performed by the digital demodulation portion 504 of the receive module 402 shown in FIG. 5. In the example shown in FIG. 5, each baseband symbol represents two bits of information. However, baseband symbols can represent other numbers of bits such as one bit, four bits (16 QAM), 6 bits (64 QAM), etc. Preferably, the minimum number of baseband samples that support demodulation of the waveforms are produced by each receive array element 104. For example, using OQPSK, one sample coincides with the I channel symbol and one sample coincides with the Q channel symbol. Using QPSK, one sample coincides with both the I and Q channel symbols and one sample is in between symbols.

Continuing to block 810, the receive module 402 combines the baseband samples with baseband samples received from one of the other receive modules. In the case of the first receive module in a column, there is no received baseband samples to combine and the combining at block 810 is omitted. However, for all other receive modules 402, the receive baseband samples are combined with the baseband samples that were demodulated at block 808. The combining at block 810 can comprise simple addition, sum of squares, complex addition, complex summed squares, etc.

At block 812, when other receive modules 402 need to be processed, the process 800 loops back to perform the functions at blocks 806 through 812 at the next receive module 402 in the column. Blocks 806 through 812 are repeated at each receive module in a column and the last receive module in a column communicates the combined demodulated samples to the data interface 416. In the case of a one-dimensional array, the combined samples are communicated directly to the control processor 410. In the case of a two-dimensional array including multiple columns, the data interface 416 combines the corresponding samples from each of the columns to arrive at the final combined composite sample. In large two dimensional arrays, multiple distributed FPGAs, e.g., one in each column, can combine the combined samples and the FPGAs can pass the combined samples from column to column and further combine the combined samples of each column.

Upon receiving the combined demodulated baseband samples, the control processor 410 determines the final baseband symbol, at block 814, based on the combined baseband samples. The combined baseband samples include individual contributions from each of the receive array elements 104 that were included in the beamforming group. The control processor 410 uses soft decision logic (e.g., soft decision Viterbi decoding) to determine the final baseband symbol value at block 814. The blocks 806 through 814 are repeated until the signal is no longer received or until the control processor 410 modifies the beamforming parameters. If beamforming parameters are modified, the functions at blocks 802 and 804 are repeated and then the functions of blocks 806 through 814 are repeated using the modified beamforming parameters.

Multiple sets of beamforming control parameters can be generated at block 802 and communicated to the same receive modules 402 at block 804 in order to demodulate multiple beam formed signals from the same received signal. In these cases, the receive modules 402 can perform the demodulation functions at blocks 806-812 multiple times, changing the beamforming parameters in order to receive the multiple beamformed signals. This can be accomplished by performing the multiple demodulations in series using a single processor in the digital demodulation portion 504 of the receive module 402. Alternatively, the multiple demodulations can be performed in parallel using one or more processors.

Figure 9:
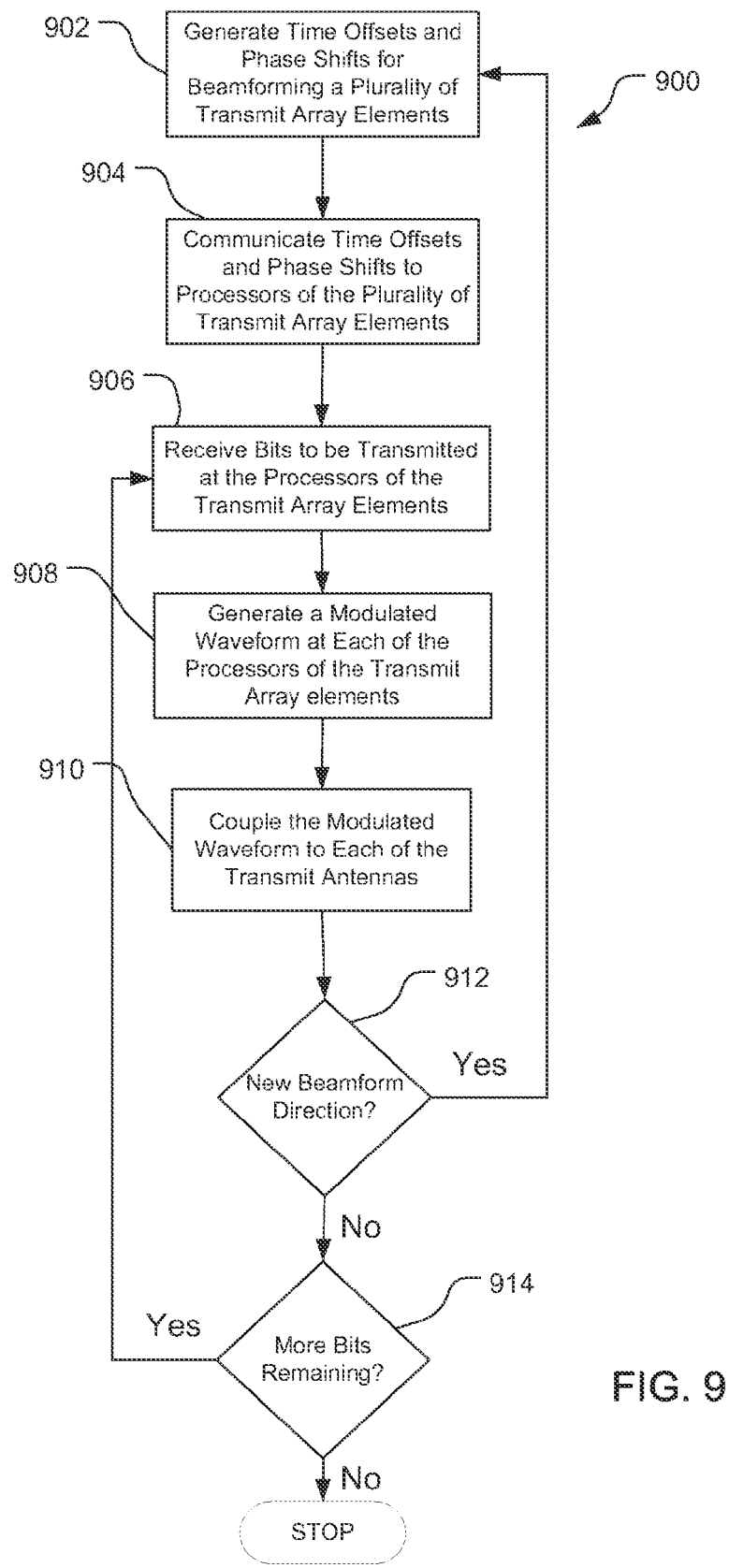
FIG. 9 depicts a flow diagram of an embodiment of a process for beamforming wireless signals across a plurality of transmit array elements.

Referring to FIG. 9, a process 900 that is performed by the central processing unit 112 and the transmit modules 602 of the transmit antenna array system 600 of FIGS. 6 and 7 includes the blocks shown. At block 902, the control processor 410 generates transmit time offsets and phase shifts (using the complex weights) for beamforming a plurality of the transmit array elements 108. The transmit time offsets and phase shifts can be for beamforming a one-dimensional array, for beamforming a two-dimensional array, or for beamforming any other array configuration.

In addition to generating transmit time offsets at block 802, the control processor 410 can also generate complex weights that modify the amplitudes of the transmit signals to further shape and/or focus a particular beam to be transmitted.

At block 904, the control processor 410 communicates the transmit time offsets (both the fine delay time and the coarse delay time discussed above), complex weights, and any other control parameters generated at block 902, to each of the transmit modules 602 via the data interface 416. The control parameters received by the data interface 416 include information identifying the antenna groups, individual antennas and/or columns of antennas with which the beamforming parameters are associated. Using this antenna identifying information, the data interface 416 communicates the information via the appropriate input lines 620 to the transmit modules 602. The transmit modules 602 are arranged in daisy chain fashion such that one transmit module forwards the beamforming control parameters associated with other transmit modules 602 to the other transmit modules 602 via the input lines 620.

Upon communicating the transmit time offsets and complex weights (and other beamforming control parameters) at block 904 from the data interface 416 to the transmit modules 602, a transmit processor associated with each of the transmit modules 602 receives bits to be transmitted at block 906 from the data interface 416 via the input lines 620. The data interface 416 receives the bits to be transmitted from the control processor 410. Alternatively, the data interface 416 could receive the bits to be transmitted from another source external to the central processing unit 112. For example, the data interface could be coupled to an external data source such as a radar, a monitoring system, video surveillance system, voice communication system, etc.

Multiple streams of bits to be transmitted can be associated with multiple beamformed signals. For example, a first bit stream can be associated with a first group of transmit array elements 108 and a second bit stream can be associated with a second group of transmit array elements 108. The first bit stream is communicated from the data interface 416 to appropriate input lines 620 in appropriate columns in the antenna array 600 in order to reach the transmit array elements 108 in the first group. The second bit stram is communicated to the transmit array elements 108 in the second group. The first and second bit streams contain information (e.g., packet header information) identifying the beamforming group and/or individual transmit array elements 108 that are to transmit each bit stream.

Upon receiving the bits to be transmitted, the processors at each of the transmit modules 602 generate a modulated waveform at block 908. The modulated waveform is generated based on the bits received at block 906 and one of the transmit time offsets and complex weights communicated at block 904 (as well as any other control parameters). The modulation at block 908 is performed by the digital modulation portion 702 and the analog modulation portion 704 of the transmit modules 602 shown in FIG. 7.

At block 910, the modulated waveform generated at block 908 is coupled to the transmit antenna elements 604 associated with each of the transmit modules 602. The multiple transmit modules are synchronized with the clock signal from the clock source 414 such that the multiple modulated signals are coupled to the antennas and transmitted at relative times as determined by the transmit time offsets to beamform the transmitted signal. As discussed above, the coarse delay parameter that is related to both beamforming (one or more full sample time periods) and processing time and transit time for the control parameters and bits to be transmitted to be communicated through the daisy chained columns transmit array elements 108.

At block 912, the control processor 410 determines if a new beamform direction is needed for any of the beamformed signals being transmitted. Changes in the direction of the beamformed signals can be necessary if one or both of the transmitting platform or the receiving platform are moving. Further, beamforming parameters can be determined to need updating at block 912 in response to a tracking loop to improve received signal strength measurements.

If it is determined, at block 912, that beamform direction changes are needed, the process 900 continues back to block 902 where the control processor 410 generates the new transmit time offsets and phase shifts and other beamform parameters needed to change the beamform direction. If no changes in beamform direction are needed, the process 900 continues from block 912 to block 914.

At block 914, the control processor 410 determines if more bits remain to be transmitted in the bit streams of any of the beam formed signals. If more bits are remaining, the process 900 loops back to perform the functions at block 906 through 914 until no bits remain to be transmitted. If no bits remain to be transmitted at block 914, the process 900 is stopped.

A number of variations and modifications of the disclosed embodiments can also be used. The antenna assembly could be used for many other applications that have electrical (high-speed fast-response) beam forming and/or null steering in a small, low cost implementation. Typical applications include mobile vehicles (e.g., airplanes, wheeled-transport, etc.), but other embodiments could use the antenna assembly for any application. The central processing unit can be co-located with the active array elements in the same assembly or could be remotely located.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore embodiments may be implemented by hardware, software, descripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or inure memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A multi-element transceiver for beamforming, the multi-element transceiver comprising:
    a plurality of transmit antennas;
    a corresponding plurality of transmit logic modules, wherein each of the plurality of transmit logic modules is electrically coupled with a corresponding transmit antenna and is electrically coupled in series with at least one other of the plurality of transmit logic modules, wherein each transmit logic module is configured to:
        receive bits to be transmitted,
        receive transmit control information,
        generate a modulated waveform from the received bits and the transmit control information, and
        send the modulated waveform to the corresponding transmit antenna;
    a plurality of receive antennas configured to receive a signal; and
    a plurality of receive logic modules, wherein each of the plurality of receive logic modules is electrically coupled with a corresponding receive antenna, is electrically coupled in series with at least one other of the plurality of receive logic modules, and is configured to receive the receive signal from the corresponding receive antenna and demodulate the receive signal to generate baseband samples, wherein the demodulation is at least partially based on receive control information.

2. The multi-element transceiver for beamforming of claim 1, further comprising a central processing unit coupled with the plurality of receive logic modules, wherein the central processing unit is configured to combine baseband samples from the plurality of receive logic modules to form a composite baseband sample.

3. The multi-element transceiver for beamforming of claim 1, wherein the plurality of receive logic modules is configured to combine baseband samples of signals received from the plurality of receive antennas to form a composite baseband sample.

4. The multi-element transceiver for beamforming of claim 1, wherein the transmit control information comprises a transmit time offset, a transmit phase shift, and/or an amplitude for each transmit logic module and corresponding transmit antenna.

5. The multi-element transceiver for beamforming of claim 1, wherein the receive control information includes a receive time offset, a receive phase shift, and/or an amplitude weighting factor for each receive logic module and corresponding receive antenna.

6. The multi-element transceiver for beamforming of claim 1, further comprising a central processing unit coupled with the plurality of transmit logic modules and the plurality of receive logic modules, wherein the central processing unit is configured to generate the transmit control information for each of the plurality of transmit logic modules and the receive control information for each of the plurality of receive logic modules.

7. The multi-element transceiver for beamforming of claim 6, wherein the central processing unit is further configured to determine final baseband symbol values based on a combination of at least some of the baseband samples generated by the plurality of receive logic modules.

8. The multi-element transceiver for beamforming of claim 1, wherein the receive logic modules is further configured to demodulate the signal to generate baseband samples using an interpolated matched filter, the interpolated matched filter being a function of the receive time offset.

9. The multi-element transceiver for beamforming of claim 1, further comprising a central processing unit configured to control the plurality of transmit logic modules to produce multiple formed transmit beams.

10. The multi-element transceiver for beamforming of claim 1, further comprising a central processing unit configured to control the plurality of receive logic modules to produce multiple formed receive beams.

11. A multi-element device for beamforming, the multi-element device comprising:
    a plurality of transmit antennas; and
    a corresponding plurality of transmit logic, wherein each of the plurality of transmit logic is electrically coupled with a corresponding transmit antenna and is electrically coupled in series with at least one other of the plurality of transmit logic, wherein each transmit logic is configured to:
        receive bits to be transmitted,
        receive control information,
        generate a modulated waveform from the received bits and the received control information, and
        send the modulated waveform to the corresponding transmit antenna.

12. The multi-element device for beamforming of claim 11, further comprising a central processor electrically coupled with the plurality of transmit logic, wherein the central processor generates the control information and is configured to send the control information to the plurality of transmit logic.

13. The multi-element device for beamforming of claim 11, wherein the control information comprises a transmit time offset, a transmit phase shift, and/or an amplitude for each of the transmit logic and the corresponding antenna.

14. The multi-element device for beamforming of claim 11, wherein the plurality of antennas and the plurality of transmit logic combine to beamform.

15. The multi-element device for beamforming of claim 11, wherein the transmit logic comprises FPGA logic.

16. The multi-element device for beamforming of claim 11, further comprising a plurality of power amplifiers, wherein each power amplifier is coupled with one of the plurality of transmit logic and the corresponding transmit antenna.

17. The multi-element device for beamforming of claim 11, wherein the transmit logic is further configured to generate the modulated waveform using an interpolating filter, the interpolating filter being a function of the transmit time offset.

18. The multi-element device for beamforming of claim 11, wherein the transmit elements are configured in at least one of a one-dimensional array, a two-dimensional array, a rectangular array, a conformal array, an annular array, and a circular array.

19. A multi-element device for beamforming, the multi-element device comprising:
    a plurality of receive antennas configured to receive a signal; and
    a corresponding plurality of receive logic, wherein each of the plurality of receive logic is electrically coupled with a corresponding receive antenna and is electrically coupled in series with at least one other of the plurality of receive logic, and is configured to receive the receive signal from the corresponding receive antenna and demodulate the receive signal to generate baseband samples, wherein the demodulation is at least partially based on control information.

20. The multi-element device for beamforming of claim 19, further comprising a central processing unit electrically coupled with the plurality of control logic, and wherein the central processing unit is configured to generate the control information for each of the plurality of receive logic.

21. The multi-element device for beamforming of claim 20, wherein the control information is specific to each of the plurality of receive logic and the corresponding receive antenna, and based on a distance between the corresponding receive antenna with other receive antennas.

22. The multi-element device for beamforming of claim 20, wherein the central processing unit is further configured to determine final baseband symbol values based on a combination of at least some of the baseband samples generated by the plurality of receive logic.

23. The multi-element device for beamforming of claim 20, wherein the receive logic comprises FPGA logic.

24. The multi-element device for beamforming of claim 19, wherein the control information includes a receive time offset, a receive phase shift, and/or an amplitude weighting factor.

25. The multi-element device for beamforming of claim 19, wherein a first receive logic of the plurality of receive logic is coupled to a second receive logic of the plurality of receive logic, and the first receive logic is configured to:

receive the baseband samples generated by the second receive logic; and combine the baseband samples generated by the second receive logic with the baseband samples generated by the first receive logic to form the combination of at least some of the baseband samples.

26. The multi-element device for beamforming of claim 25, wherein the first receive logic is coupled to a third receive logic of the plurality of receive logic, and the first receive logic is further configured to forward the combination of at least some of the baseband samples to the third receive logic.

27. The multi-element device for beamforming of claim 19, wherein the receive antennas are configured in at least one of a one-dimensional array, a two-dimensional array, a rectangular array, an annular array, a conformal array, and a circular array.

28. The multi-element device for beamforming of claim 19, wherein the receive logic is further configured to demodulate the signal to generate baseband samples using an interpolated matched filter, the interpolated matched filter being a function of the receive time offset.

* * * * *